Jan. 31, 1933.  B. L. YORK  1,895,697

SUPPORTING ELEMENT FOR CONFECTIONS

Filed March 14, 1932

INVENTOR.
Bertrand L. York
BY
Harry Q. Schroeder
ATTORNEYS.

Patented Jan. 31, 1933

1,895,697

UNITED STATES PATENT OFFICE

BERTRAND L. YORK, OF PIEDMONT, CALIFORNIA

SUPPORTING ELEMENT FOR CONFECTIONS

Application filed March 14, 1932. Serial No. 598,693.

This invention is a confection support or mounting means therefor and is directed to a method of supporting edible materials in conveniently handled portions.

The main object of the invention is to provide various edible substances such as frozen confections, cake, glacé fruits, in such form and with a handle so disposed as to permit the confection to be eaten in a most convenient manner.

Another object of the invention is to provide a confection formed in the shape of a disk with a central hub of relatively hard material provided with a central aperture, and a removable handle adapted to be frictionally secured in the aperture.

Other objects and advantages of the invention will become apparent as the following description is read on the drawing forming a part of this specification and in which similar reference characters are used to indicate similar parts throughout the several views of which:

Figure 1:
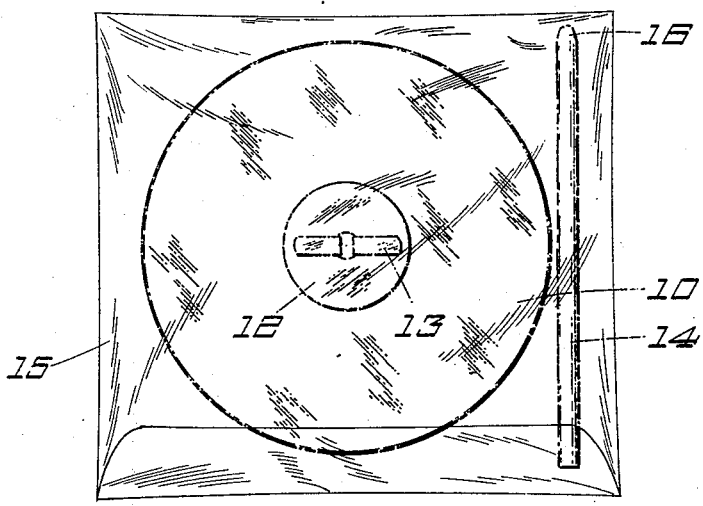
Fig. 1 is a plan view of the invention as packed in a transparent moisture proof wrapper.

The invention consists of a portion 10 of edible material, which may consist of plain ice cream, chocolate coated ice cream, frozen sherbets, water ice, frozen pudding, candies, fruit, such as slices of fresh pineapple, glacé fruits, or cake, and which is provided with an axial aperture in which is inserted a hub 11 of relatively hard material either edible or inedible, flanges 12, and a resilient securing element 13, which is adapted to frictionally secure a handle 14.

The confection is packed as shown in Fig. 1, the handle 14 being separate as shown, the wrapper 15 being made of "Cellophane", or transparent to translucent waterproof paper.

The hub 11 may be formed integral with discs 12 and the confection molded or frozen with the hub in position, or, the hub and discs may be separate and inserted after the confection is formed, and secured by means of the clip 13.

The hub and discs may be made of hard candy, wood or paper, as may be desired, and the clip 13 may be the standard brass paper clip or may be formed of cardboard.

The handle is preferably made of wood with pointed or rounded end 16 so that it may readily be inserted in the aperture in the hub, although the handle may be formed of hard candy or other material.

Figure 2:
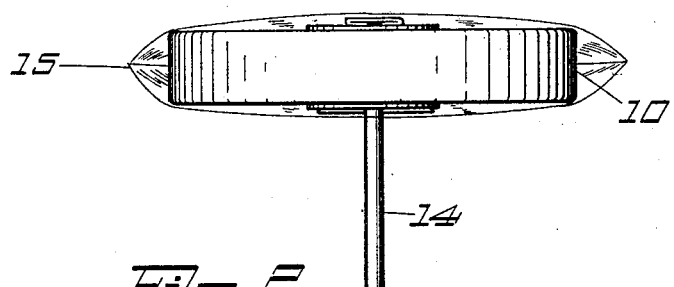
Fig. 2 is a side elevation of the invention with the handle in place.
Figure 3:
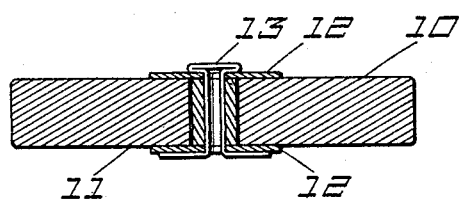
Fig. 3 is a transverse section through the invention.

The confection and handle are packed in a wrapper as shown in Fig. 1 and it is only necessary to remove the handle and insert it into the hub aperture, through the wrapper as shown in Fig. 2, the head of the clip 13 acting as a stop for the end of the handle.

For frozen confections, such as ice cream sherbets and water ice, the confections may be frozen in a cylindrical, shallow container provided with a central hub or the hub may be frozen in place in the confection.

Pineapple is prepared in slices and a hole provided in the center of the slice.

Having described an operative method of forming the confection it will be understood that variations in construction and form which are consistent with the appended claims may be resorted to without detracting from the spirit or scope of the invention or sacrificing any of the advantages thereof.

I claim:

1. A confection comprising a disc-like element of edible material provided with an axial aperture, a resilient element having a head adapted to close one end of said aperture and a handle adapted to be inserted in said aperture and frictionally secured by said resilient element.

2. A confection comprising a disc of edible material provided with an axial aperture, a hub of relatively hard material provided with an axial aperture disposed in said axial aperture in said disc, a resilient element in said hub aperture and a handle frictionally secured by said resilient element.

3. A supporting element for confections consisting of a hub to be secured in the confection and having an axial aperture, discs forming flanges for each end of the hub, a resilient element for securing the discs and hub together and a handle adapted to be frictionally secured by said resilient element in said aperture.

In testimony whereof I affix my signature.

BERTRAND L. YORK.